United States Patent Office 2,882,119
Patented Apr. 14, 1959

2,882,119

PROCESS FOR DYEING POLYESTER MATERIALS AT ELEVATED TEMPERATURES IN STABILIZED NON-AQUEOUS DISPERSE DYEBATH

Joseph Francis Laucius, Wilmington, Del., and Joseph P. Neary, Carneys Point, N.J., assignors to E. I. du Pont de Nemours and Company, Wilmington, Del., a corporation of Delaware No Drawing. Application February 20, 1956
Serial No. 566,384

4 Claims. (Cl. 8—55)

This invention is directed to the process of dyeing polyester materials at elevated temperatures with selected disperse dyes, formerly called dispersed dyes, carried in a non-aqueous liquid stabilized against decomposition in the hot dyebath by incorporating therein certain strong acids.

Continuous dyeing methods which permit the control and reproducibility of shade are needed. These methods must be capable of operating to yield large outputs at high speeds. In view of this need, the trade looked to the non-aqueous solvent media utilizing temperatures above the boiling point of water to reduce the dyeing time. This approach is exemplified by French Patent No. 1,095,941.

It is necessary in present day commercial operations to maintain the dyebath at a temperature well above 150° C. for many hours. For example, it may take 20 hours to process large yardages of materials and dulling of shade is often noticed after one hour due to the destruction of the dye in the hot dyebath; as a result only the first 1,000 to 2,000 yards of dyed fabric are of acceptable quality.

It is an object of this invention to prevent the decomposition of disperse dyes contained in a non-aqueous liquid utilized for dyeing polyester materials at elevated temperatures.

More specifically, it is an object of the present invention to provide a process for dyeing of polyethylene terephthalate with disperse anthraquinone dyes, said dyes being mono and diamino anthraquinones in which the amino groups are in alpha position in the anthraqunione nucleus, said amino groups being of the formula —NRH, where R is H, $CH_3$, $CH_2$—$CH_2OH$, and phenyl, and, when R is H, the adjacent position is occupied by a group selected from the group consisting of halogen, lower alkyl, lower alkoxy, nitro and carboximide, the improvement wherein the polyethylene terephthalate is impregnated with a non-aqueous dyebath comprising a disperse dye, a strong acid and an alkylene glycol of the class: ethylene glycol, diethylene glycol, triethylene glycol, propylene glycol and dipropylene glycol, said acid being present in an amount within the range of about 0.1 to 0.5 weight percent (based on the dyebath), said acid being taken from the group consisting of sulfuric, phosphoric, monochloroacetic, tartaric, oxalic or an acid-liberating salt of said acid, said dyebath being maintained at a temperature within the range of about 130 to 200° C.

The polyethylene terephthalate materials to which this process may be applied include fiber, fabric, films, molded articles and also articles which are metallized; i.e., they have thin films of aluminum, copper, gold, etc., applied to one or more surfaces. Yarns in rope form, blends and combinations with other fabrics are also operable.

The disperse dyes contemplated by the present invention are water-insoluble azo and anthraquinone dyes. These dyes are free from water solubilizing groups such as sulfonic and carboxylic acid groups, but may contain hydroxyl, sulfonamide, halogen and other non-solubilizing radicals. These dyes may be dispersed in water by the aid of anionic dispersing agents and are often called acetate dyes because of their affinity for cellulose acetate.

The group adjacent to the amino is selected from the group consisting of halogen, lower alkoxy, lower alkyl, nitro and carboximide; by "lower" is meant a group having 1 to 4 carbon atoms.

Other substituents such as hydroxyl, nitro or halogen may also be present in the anthraquinone ring. Representative operable antharquinone derivatives are 1,8-dihydroxy - 4 - anilino - 5 - nitro, 1 - amino - 2 - chloro - 4-hydroxy, 1 - amino - 2 - methoxy - 4 - hydroxy, 1 - methylamino, 1,5 - dihydroxy - 4,8 - di(methylamino), 1-methylamino - 4 - (2 - hydroxyethyl)amino, 1,4 - diamino - 2,3-dichloro, 1,4 - di(methylamino), 1 - amino - 2 - methyl, 1,4 - di(2-hydroxyethylamino), 1-carbethoxyamino-4-hydroxy, 1,4-diamino-2,3-dicarboximide, and 1-hydroxy-4-(3'-methylol)anilino.

Representative alkylene or polyalkylene glycol solvents are ethylene glycol, diethylene glycol, triethylene glycol, propylene glycol and dipropylene glycol.

The known operable acids which stabilize the defined disperse dyes have ionization constants within the range of $1 \times 10^{-2}$ to $1 \times 10^{-4}$. By "acid liberating salts" is meant salts of the defined acids with a weak base such as ammonium hydroxide. The dyeing time in the present process may be widely varied to control the depth of shade and has no bearing on the operability of the claimed process.

The present invention enables a mill to operate continuously for long periods of time or to dye batch-wise in such a way that the hot bath is reused repeatedly and thus kept hot for long periods of time.

The following examples are illustrative of the claimed invention:

EXAMPLE 1

*No acid added*

Four parts of the blue dye 1,8-dihydroxy-4-anilino-5-nitroanthraquinone is pasted in a small amount of diethylene glycol and then stirred well as a total of 100 parts of additional solvent is added.

The solution is agitated at 180° C. and a strip of polyethylene terephthalate fabric is passed through the dye liquor in such a way that the contact period is 5 seconds. The fabric is rinsed in water and scoured in 1% aqueous solution of dodecyl sulfate (sodium salt) for 15 minutes at the boil. The fabric is smoothly and evenly dyed a medium bright greenish-blue shade which is well penetrated and exhibits good fastness to light, rubbing and washing.

Simulating the time required for the continuous processing of up to about 40,000 yards of material on a commercial scale, repeat dyeings are obtained in the original liquor after it has been maintained at 180° C. for 1, 2, 4 and 20 hours. Dulling, greening and weakening of shade is detected in dyeings made after one hour. These undesirable effects steadily increase as time is extended, so that only about the first 1000 yards are of saleable quality.

EXAMPLE 2

*Phosphoric acid added*

When 0.4 part of phosphoric acid (85%) is added to the dye liquor of Example 1 prior to reaching the dyeing temperature, and the procedure is repeated exactly as in Example 1 in every other respect, the dyeings have the original bright blue shade for dyeing periods up to 24 hours.

EXAMPLE 3

Sulfuric acid added

The procedure of Example 2 is repeated, except that 0.2 part of 96% sulfuric acid is added to the dye liquor in lieu of phosphoric acid.

The blue shade of the dyeings remains reproducible even after the dye liquor has been held at 180° C. for more than 24 hours.

Shade reproducibilities comparable to those of Example 2 are obtained by substituting for the phosphoric acid any one of the following: 0.2 part of chloroacetic acid, 0.5 part of diammonium phosphate, 0.5 part of ammonium tartrate and 0.2 part of oxalic acid.

EXAMPLE 4

Example 2 is repeated, using the following glycols instead of diethylene glycol: ethylene glycol, triethylene glycol, propylene glycol and dipropylene glycol. In each case the fabric is dyed a bright blue shade after extended use of the dyebath.

EXAMPLE 5

When Example 2 is repeated at 160° C., 170° C. and 200° C., the same reproducibility of shade is obtained after prolonged use of the dyebath. The only difference in result is that the 160° C. and 170° C. dyeings are lighter, and the 200° C. dyeing is heavier, than the Example 1 dyeing.

EXAMPLE 6

The procedure of Example 2 is followed, using each of the following dyes:

| Anthraquinone derivative: | Shade |
|---|---|
| 1-amino-2-chloro-4-hydroxy | Red |
| 1-amino-2-methoxy-4-hydroxy | Pink |
| 1-methylamino | Red |
| 1,5-dihydroxy-4,8-di(methylamino) | Blue |
| 1-methylamino-4-(2-hydroxyethylamino) | Blue |
| 1,4-diamino-2,3-dichloro | Violet |
| 1,4-di(methylamino) | Blue |
| 1-amino-2-methyl | Orange |
| 1,4-di(2-hydroxyethylamino) | Blue |
| 1-carbethoxyamino-4-hydroxy | Orange |
| 1,4-diamino-2,3-dicarboximide | Blue |
| 1-hydroxy-4(3'-methylol)anilino | Blue-violet |

In each case, satisfactory bright dyeings of the indicated shades are obtained even though the dyebath was used over periods extending to 24 hours.

EXAMPLE 7

Polyethylene terephthalate film is dyed according to the procedure of Example 2 except that the process is carried at 130° C. for 30 seconds contact time. The film was dyed a deep blue and the shade was reproducible for a 24-hour period of dyebath-use.

EXAMPLE 8

Example 7 was repeated except that the polyethylene terephthalate had a film of aluminum bonded to one surface. The polyethylene terephthalate was dyed a deep blue and the aluminum film remained intact.

We claim:

1. In the process of dyeing polyethylene terephthalate with a disperse anthraquinone dye taken from the group consisting of mono and diamino anthraquinone dyes, the amino groups in said dyes being in alpha position in the anthraquinone nucleus, said amino groups being represented by the radical —NRH, R being taken from the group consisting of H, $CH_3$, $CH_2$—$CH_2OH$ and phenyl; when R is H, the adjacent position is occupied by a radical taken from the group consisting of halogen, lower alkoxy, lower alkyl, nitro and carboximide, the improvement wherein the polyethylene terephthalate is impregnated with a non-aqueous dyebath comprising a disperse dye, an alkylene glycol taken from the group consisting of ethylene glycol, diethylene glycol, triethylene glycol, propylene glycol and dipropylene glycol, said dyebath being maintained at a temperature within the range of 130 to 200° C. and said dyebath containing from about 0.1 to 0.5 weight percent, based on the dyebath, of a compound taken from the group consisting of an acid taken from the group consisting of sulfuric, phosphoric, monochloroacetic, tartaric, oxalic acids and the acid liberating salts of said acids.

2. The process of claim 1 wherein the alkylene glycol is diethylene glycol.

3. The process of claim 1 wherein the alkylene glycol is propylene glycol.

4. The process of claim 1 wherein the acid component is phosphoric acid.

References Cited in the file of this patent

UNITED STATES PATENTS

| 2,692,272 | Perkins | Oct. 19, 1954 |
| 2,757,064 | Speck | July 31, 1956 |

FOREIGN PATENTS

| 1,095,941 | France | June 7, 1955 |

OTHER REFERENCES

Modern Textile Magazine, November 1953, pp. 60–61.

Du Pont Technical Bulletin, vol. 10, No. 1, March 1954, p. 26.